United States Patent [19]

Sawa

[11] Patent Number: 5,333,538
[45] Date of Patent: Aug. 2, 1994

[54] FOOD EXTRUDER MACHINE

[75] Inventor: Kiyohiko Sawa, Kobe, Japan

[73] Assignee: Kabushiki Kaisha Kobe Seiko Sho, Kobe, Japan

[21] Appl. No.: 694,915

[22] Filed: May 2, 1991

[51] Int. Cl.$^5$ ............................................. A22C 25/00
[52] U.S. Cl. ..................................... 99/353; 425/131.1; 425/378.1; 425/463
[58] Field of Search ............ 99/353; 425/131.1, 131.5, 425/378.1, 462, 463

[56] References Cited

U.S. PATENT DOCUMENTS

| | | | |
|---|---|---|---|
| 1,516,843 | 11/1924 | Buttfield | 425/378.1 |
| 1,768,790 | 7/1930 | Royle | 425/378.1 |
| 1,814,820 | 7/1931 | Boswell | 425/378.1 |
| 3,162,147 | 12/1964 | Amato | . |
| 3,213,808 | 10/1965 | Schafer | . |
| 3,538,545 | 11/1968 | Smith | 425/131.5 |
| 3,551,951 | 1/1971 | Schiesser | 425/462 |
| 4,118,167 | 10/1978 | Luno et al. | 425/463 |
| 4,128,372 | 12/1978 | Rose et al. | 425/463 |
| 4,395,217 | 7/1983 | Benadi | 425/378.1 |
| 4,454,804 | 6/1984 | McCulloch | 99/353 |
| 4,615,894 | 10/1986 | Ruegg | 99/353 |
| 4,667,369 | 5/1987 | Felstehausen | 425/463 |
| 4,900,572 | 2/1990 | Repholz et al. | . |
| 5,048,405 | 9/1991 | Takahashi et al. | 99/353 |

FOREIGN PATENT DOCUMENTS

| | | | |
|---|---|---|---|
| 723076 | 12/1965 | Canada | 425/131.5 |
| 0100184 | 2/1984 | European Pat. Off. | . |
| 0168276 | 1/1986 | European Pat. Off. | . |
| 0213204 | 3/1987 | European Pat. Off. | . |
| 226515 | 8/1985 | Fed. Rep. of Germany | 425/463 |
| 1502396 | 10/1967 | France | 425/131.5 |
| 846305 | 7/1981 | U.S.S.R. | 425/463 |
| 1516526 | 10/1989 | U.S.S.R. | 425/131.5 |
| 105426 | 4/1917 | United Kingdom | 425/378.1 |
| 1101452 | 1/1968 | United Kingdom | 425/131.5 |
| 1312074 | 4/1973 | United Kingdom | 425/131.1 |

OTHER PUBLICATIONS

Patent Abstracts of Japan, vol. 11, No. 365(C-460)[2812], Nov. 27, 1987, & JP-A-62-138178, Jun. 20, 1987, K. Sugano, "Extrusion Processing Of Food And Apparatus Therefor".

Primary Examiner—Timothy F. Simone
Assistant Examiner—Mark Spisich
Attorney, Agent, or Firm—Oblon, Spivak, McClelland, Maier & Neustadt

[57] ABSTRACT

A food extruder machine includes a molding barrel having several axial holes spaced in a circumferential direction for passing a major material and a core. A die head has a fine narrow die hole arranged opposite a cone part at an extreme end of the core via an annular clearance. A sub-material supplying device connected to the annular clearance so as to supply a molten sub-material for collecting and binding to a major thread-like material extruded from an axial hole and passing through it.

5 Claims, 5 Drawing Sheets

FOOD EXTRUDER MACHINE

BACKGROUND OF THE INVENTION

1. Field of the Invention

This invention relates to a food extruder machine for use in molding and processing a food such as a crab stick having fibrous tissue, for example.

2. Description of the Related Art

In a technology for applying pressure and heat to a fish meat or a plant protein with a screw type extruder, melting them, rearranging them in aligned strands of fibrous fine tissue and cooling them upon extrusion so as to make a final thread-like food, as shown in FIGS. 3 and 4, there is known an extruder machine.

This known art may be used to manufacture a crab stick, wherein a molten material extruded from an extruder 19 having a barrel and a screw is formed into a sheet-like shape while cooling it with a sheet die 35, the sheet material 36 is longitudinally cut into thread-like elements with a multi-grooved disk cutter 38 or the sheet is formed with some slits. The formed material is further enclosed with a kneaded product, packaged with a wrapping film, bound with a stripe, and then steam boiled to make a final product.

SUMMARY OF THE INVENTION

In case of the aforesaid known art, its use becomes complicated and expensive due to the fact that it requires a sheet manufacturing step, a sheet transporting step, a sheet cutting step, various independent steps and some devices in a process starting from its molten material to a produced thread-like material.

In addition, in case that the material is formed into a sheet element 36 through a sheet die 35, it is not possible to make a large-sized sheet due to a certain limitation in a width size and at the same time a certain irregular quality may be generated at both lateral ends and a central part of the sheet member 36. In addition, the thread-like product is enclosed with the kneaded material after its binding state, resulting in that a casing of fish paste product is formed to cause a bad taste and a poor outer appearance as an imitation food.

In case of the known art, one extruder device 19 is required for each sheet die 35. This is due to the fact that a supplying of molten material from one extruder to a plurality of sheet dies at different distances causes a poor flow of material to be attained at the sheet die furthest from the extruder and finally a non-uniform quality of the product is attained. Due to this fact, a mass production of the sheet material is difficult.

It is an object of the present invention to provide a food extruder machine for resolving the aforesaid problems of the known art.

It is another object of the present invention to provide a food extruder machine comprising a molding barrel having several axial holes in a circumferential direction for passing a major material and a core to be fitted in or out of to each other; a die head having a fine narrow die hole oppositely arranged against a cone part at an extreme end of the core through an annular clearance; and a sub-material supplying means connected to the annular clearance so as to supply a molten sub-material for collecting and binding to a major thread-like material extruded from an axial hole and passing through it.

It is a still further object of the present invention to provide a food extruder machine in which a fixing block having a plurality of molding barrels in a circular form and having a rear part of the core passes therethrough and the major material extruder device having an extruder barrel fixed to the fixing block and an extruder screw arranged within the extruder barrel are arranged, a center of the extruder barrel is substantially coincided with a center of a circular arrangement of the molding barrel, and an annular spacing at an outer circumference of each of the cores and communicating with the axial hole and the extruder barrel is formed between the extruder barrel and the fixing block.

It is a still further object of the present invention to provide a food extruder in which the cores are hollow and a cooling means composed of a cylinder having helical fins is arranged.

It is a yet still further object of the present invention to provide a food extruder machine comprising a plurality of molding units including a molding barrel, cores arranged in the molding barrel and a die head fixed at an extreme end of each of the cores; an extruder having a plurality of molding units arranged on a circle and composed of an extruder barrel and an extruder screw arranged at a center thereof; and molding material supplying passages for supplying the molding material from the extruder to each of the molding units.

It is a further object of the present invention to provide a food extruder machine comprising a die holder provided with a mean pressure chamber for the molding material; a molding barrel connected to the die holder; cores fitted to the molding barrel and provided with a temperature adjusting means; and an extruder molding groove arranged at either at least one of an outer circumferential surface of the core and an inner surface of the molding barrel, communicated with the mean pressure chamber and having a required parallel sectional shape with an axial direction of the core.

It is another object of the present invention to provide a food extruder machine in which the die holder is provided with a connector member connected to an extruder for a molding material and a temperature adjusting means for use in controlling a temperature of the molding material within a mean pressure chamber.

It is a still further object of the present invention to provide a food extruder machine in which the extruder molding groove is formed in a cylindrical member fitted between the molding barrel and the core.

The present invention resolves each of the aforesaid problems and enables a simultaneous mass-production of respective thread-like product having a superior fibrous tissue by improving a die head structure, applying an extruder molding groove with any optional section formed axially between a cylindrical outer die cylinder and a die core, passing the pre-formed material through a nozzle of fine hole diameter, and extruding the material under the same condition. More practically, the present invention is comprised of a die holder connected to a barrel of an extruder machine, having a temperature adjusting means and a mean pressure chamber for a feeding material; a die outer cylinder connected to the die holder and having a temperature adjusting means; and a die core fitted inwardly to the die outer cylinder, having a temperature adjusting cylinder, a row of extruder molding grooves of desired sectional shape in parallel with an axial direction so as to be communicated with the mean pressure chamber at an entire outer circumferential surface.

The food raw material is fed into the extruder, agitated, kneaded under a high temperature and a high pressure by two axial extruding screws within the extruder barrel and melted, then the material passes through the circular extruder space between the extruder barrel and the fixing block, and extrusion supplied to a plurality of annular spacings. Since a plurality of annular spacings are arranged in a circular form around a center of the extruder barrel, the molten material (including a semi-molten state, similarly applied hereinafter) is uniformly supplied to all the annular spacings and further at each of the annular spacings, a flowing dynamic pressure at each of the positions in the spacings becomes substantially uniform.

The molten material fed into each of the annular spacings may flow along an outer circumferential surface of the core, enter an axial hole formed by the core and the molding barrel, and the fibrous tissues are cooled while they are being in a flowing direction of the material.

BRIEF DESCRIPTION OF THE DRAWINGS

FIGS. 1 and 2 illustrate one preferred embodiment of the present invention, wherein FIG. 1 is an entire side sectional view in section and FIG. 2 is an enlarged side elevational view in section.

DESCRIPTION OF THE PREFERRED EMBODIMENTS

Preferred Embodiment No. 1

Figure 1:
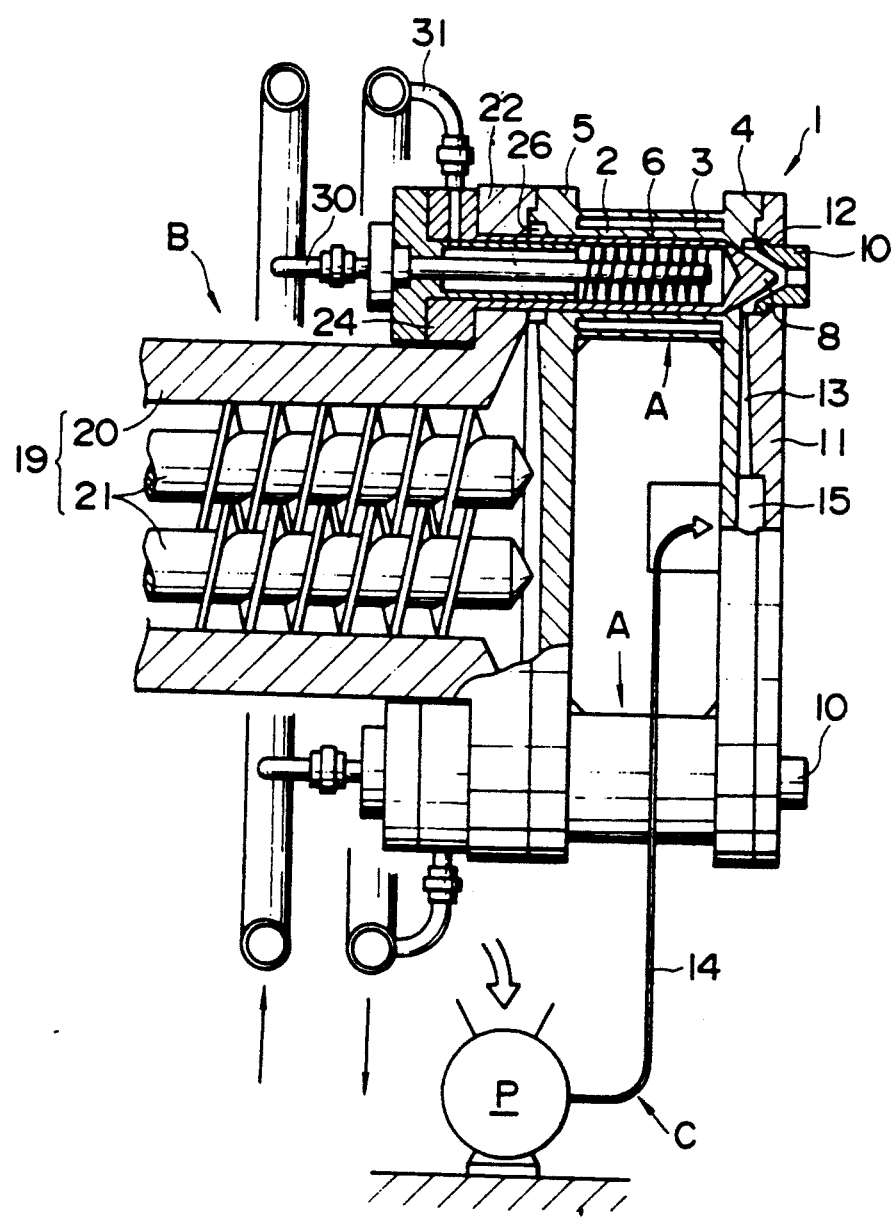
Figure 2:
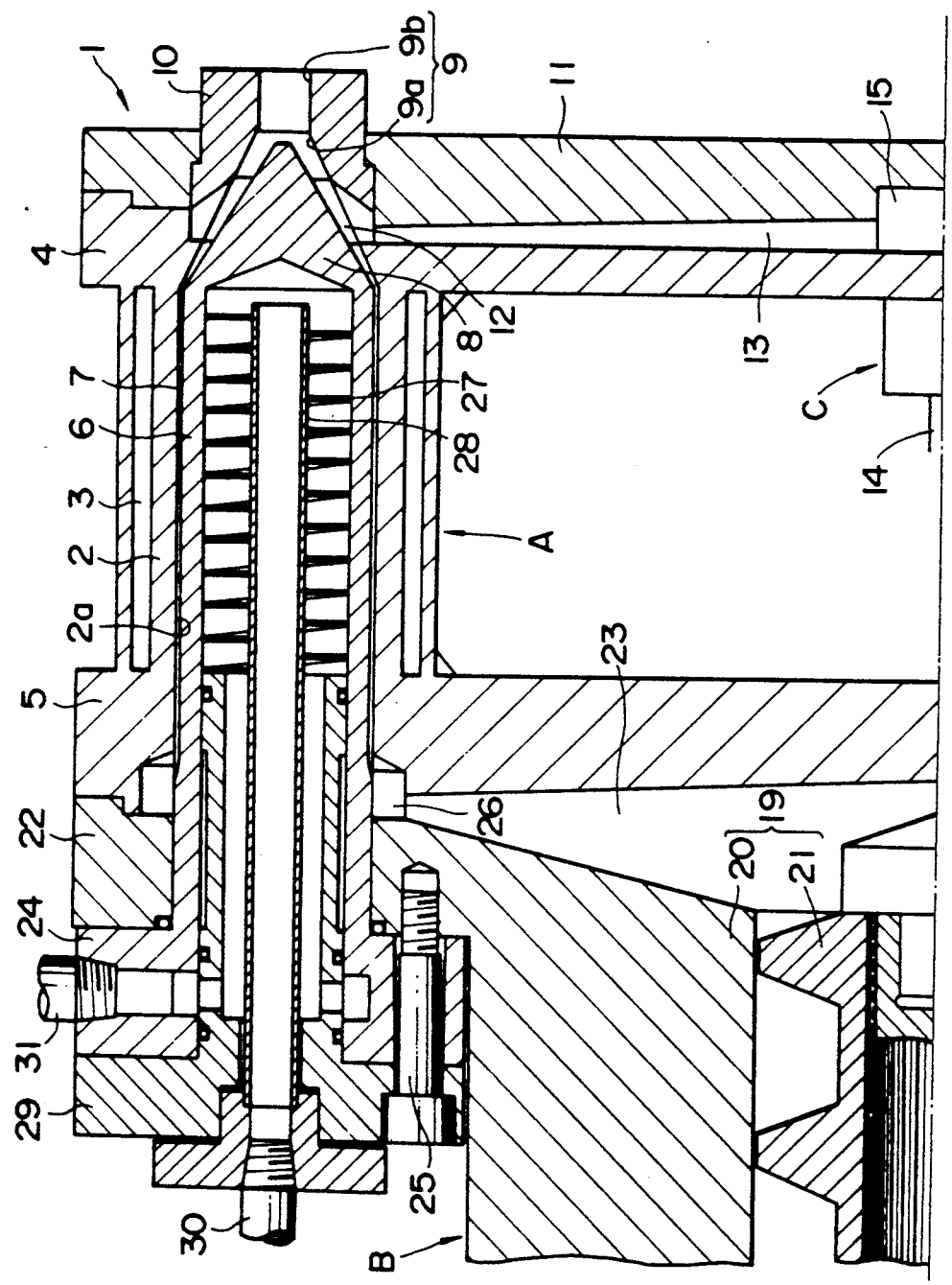
Figure 3:
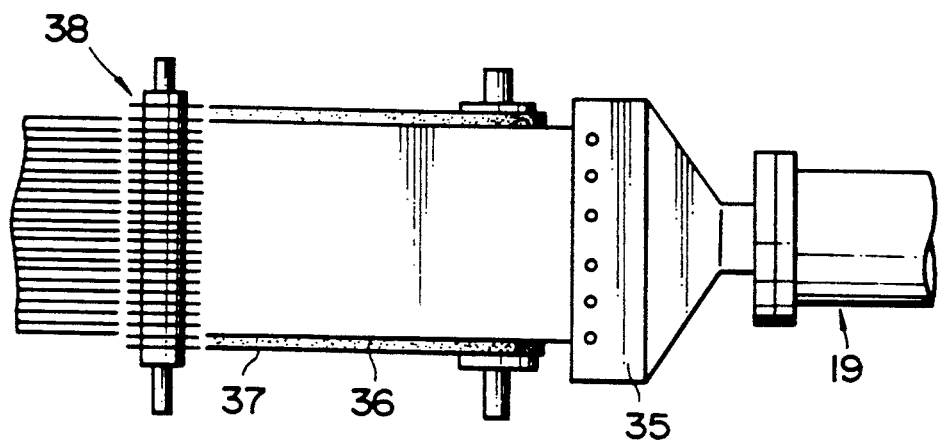
FIGS. 3 and 4 are a top plan view and a side elevational view for showing the conventional art, respectively.
Figure 4:
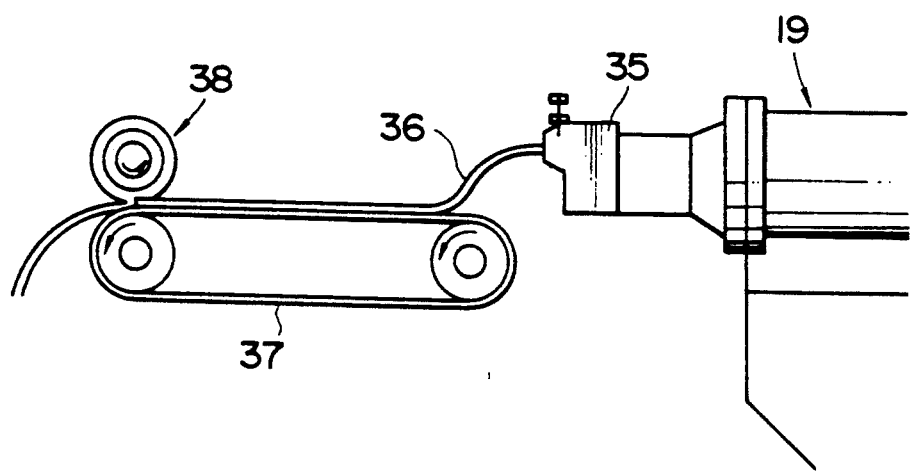

Referring now to the drawings, the preferred embodiments of the present invention will be described. In FIGS. 1 and 2, a food extruder machine 1 is composed of a plurality of molding units A arranged in a circle and one extruding unit B for use in supplying a major material to all the molding units A.

At the molding units A, reference numeral 2 denotes a cylindrical molding barrel, a cold water passage 3 is formed within its cylindrical wall so as to form a cooling jacket structure. The supporting block 4 and the fixing block 5 are fixed or integrally molded across the molding barrel 2 and the core 6 is arranged to pass through these units.

The core 6 is formed with several circumferential spaced axial grooves at its outer circumferential surface, and is contacted with an inner circumferential surface 2a of the fitted molding barrel 2 to form axial passages or holes, at the locations of the grooves 7. The axial holes 7 have a substantial rectangular or circular shape in section and also extends between core 6 and the fixing block 5. An extreme end of the core 6 is formed with a narrow cone part 8 and then a die head 10 having a narrow die hole 9 is arranged in opposition to the cone part 8.

The die head 10 is fixed to a die holder 11 fixed to the supporting block 4. The die hole 9 has a conical hole 9a and a cylindrical hole 9b. The cylindrical hole 9b has a sectional shape corresponding to a shape of the final product. An annular clearance 12 defined by the cone part 8 and the supporting block 4 is formed at an upstream side of the conical hole 9a.

A flow passage 13 communicated with the annular clearance 12 is formed between the supporting block 4 and the die holder 11. The flow passage 13 is connected to a pump P arranged outside the extruder machine 1 through a pipe 14. This pump P may supply the same material as the major material supplied into the molding barrel 2 or material different from the extruding unit B from a separate extruder. A sub-material supplying means C is formed by the passage 13 and the pump P or the like.

As the major melted material is supplied between the extruding barrel 2 and the core 6, the major material passes through the axial holes 7, becomes a thread-like product while being cooled and then the material is extruded to the annular clearance 12. At this time, the annular clearance 12 is filled with the melted sub-material such as kneaded material or the like by the sub-material supplying means C. The sub-material is applied to the thread-like product or immersed in it and extruded together from the die hole 9. The sub-material becomes a part of the food and at the same time it becomes a binder for binding the threads of the thread-like major material to each other.

The extruding units A can be assembled at a front part of a extruder unit and applied for processing a stick-like food such as one crab stick or the like. In this case, a plurality of sets of extruding units are assembled at the front part of one extruder as a device for performing a simultaneous processing of a plurality of stick-like foods.

The fixing block 5, the supporting block 4 and the die holder 11 are of a disk plate, for example, and a plurality of extruding or molding units A are arranged around a center of it. Thus, a plurality of molding barrels 2 are equally spaced apart and fixed in a circumferential direction to the fixing block 5 and the supporting block 4. The core 6 is inserted into each of the molding barrels 2. The die holder 11 is fixed with the die head 10 and is concentric with each of the molding barrels 2. The die holder 11 is telescopically connected to the supporting block 4 by bolts or clamps. A reservoir 15 for the sub-material supplied from the pump P is formed at a center of the die holder and then radial or disk-like flow passages 13 extend from the reservoir 15.

At the extruding part B is arranged a well-known extruder device 19. That is, the extruder device 19 has two axial (or one axis is also available) extruding screws 21 within the extruder barrel 20. The major material is agitated and kneaded at a high temperature and a high pressure to create a melted state and then the material is extruded out of the extreme end of the extruding barrel 20.

A flange part 22 at the front part of the extruding barrel 20 is telescopically coupled to a rear surface of the fixing block 5 and fixed by bolts or clamps. A center of this extruding barrel 20 is coincided with a center of a circular arrangement of the molding part A. The molding part A is arranged without contact with an outer circumference of the extruding barrel 20.

The front surface of the extruding barrel 20 is formed with a circular extruding space 23 between it and the fixing block 5 and this space becomes a passage for radially dispersing the molten material being extruded from the extruder device 19. An outer circumferential surface of the circular extruding space 23 is a pitch circle of the circular arranged cores 6.

The core 6 passes at its rear part through the flange 22 and the fixing part 24 at the rear end is fixed to the rear surface of the flange part 22 via bolts 25. An annular spacing 26 is formed at an outer circumference of the core 6 corresponding to a coupling position between the fixing block 5 and the flange 22. This annular space 26 is formed in the fixing block 5 concentrically with the hole of the molding barrel 2 and further forms a larger diameter groove than the hole. The spacing 26 is communicated with the circular extruding spacing 23 at its substantial semi-circumferential part and is made deeper than an outer peripheral part of the extruding spacing 23.

The annular spacing 26 is communicated with all the axial holes 7 at each of the molding units A and further communicated with the extruding barrel 20 through the extruding spacing 23, so that the melted major material being extruded by the extruding screws 21 is first accumulated and supplied at a uniform circumferential pressure to each of the axial holes 7.

The core 6 has a hollow interior, and/a cylinder 28 having some helical fins 27 is inserted into the core. The cylinder 28 is held by the holder 28 inserted at a rear end of the core 6. To the cylinder 28 is connected a cold water supplying pipe 30. To the fixing part 24 is connected a cold water discharging pipe 31, resulting in a water jacket in which the cold water supplied through within the cylinder 28 passes between the fins 27 to cool the core 6, passes between an outer circumference of the cylinder 28 and the holder 29 and then is discharged from the fixing part 24.

The present invention is not limited to the aforesaid preferred embodiment but may be modified into various forms. For example, the axial holes 7 may be formed by arranging the axial grooves at an inner circumferential surface 2a of the molding barrel 2 or by inserting a cylinder between the molding barrel 2 and the core 6, forming through-holes in the cylinder. In case that the sub-material which is the same as the major material is applied, a center of the fixing block 5 and a center of the supporting block 4 are communicated through a pipe, the major material at the extruding part B is directly supplied to the annular clearance 12 while being melted so as to enable it to be used as the sub-material. In order to control a temperature of the material within the extruding spacing 23, a heater may be fixed to the fixing block 5 or the jacket structure is formed to receive a thermal medium therethrough so as to enable a temperature to be adjusted.

Preferred Embodiment No. 2

Figure 5:
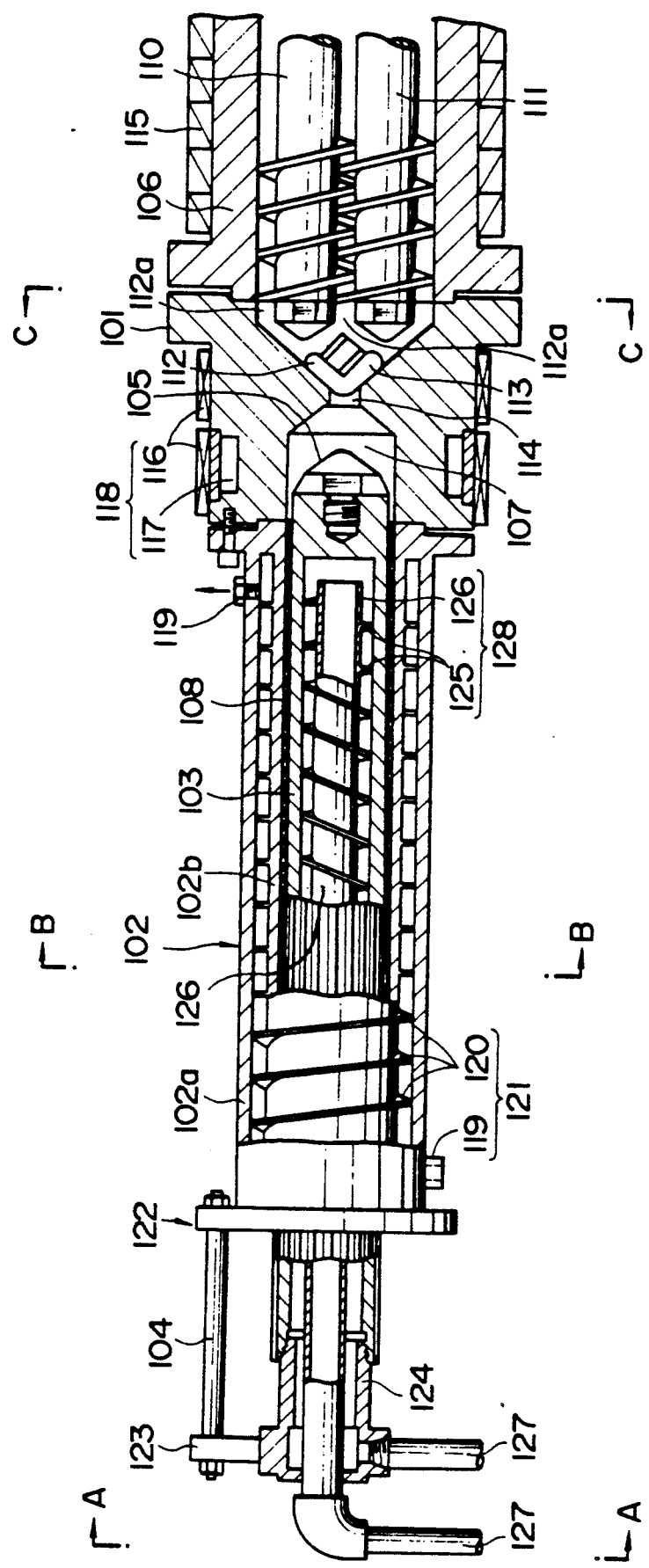
FIG. 5 is a longitudinal front elevational view in section for showing a preferred embodiment of the head of the present invention.
Figure 6:
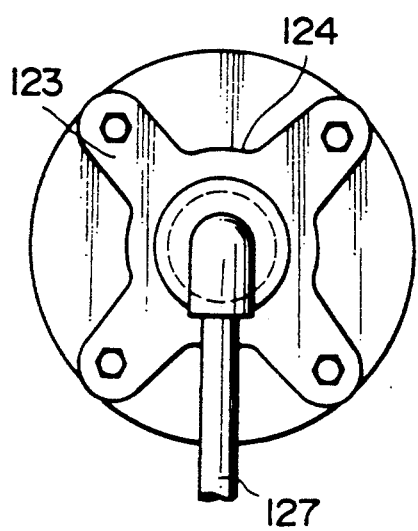
FIG. 6 is a side elevational view taken along an arrow A—A in FIG. 5.
Figure 7:
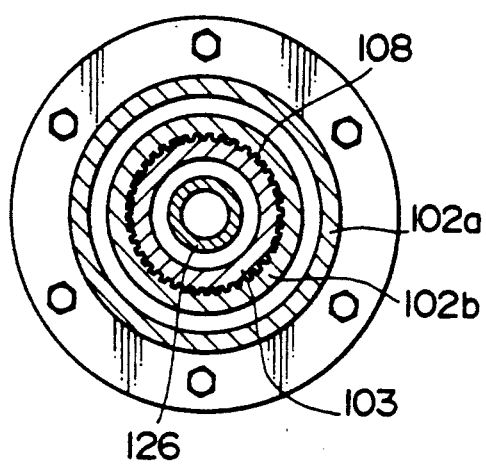
FIG. 7 is a side elevational view taken along an arrow B—B in FIG. 5.
Figure 8:
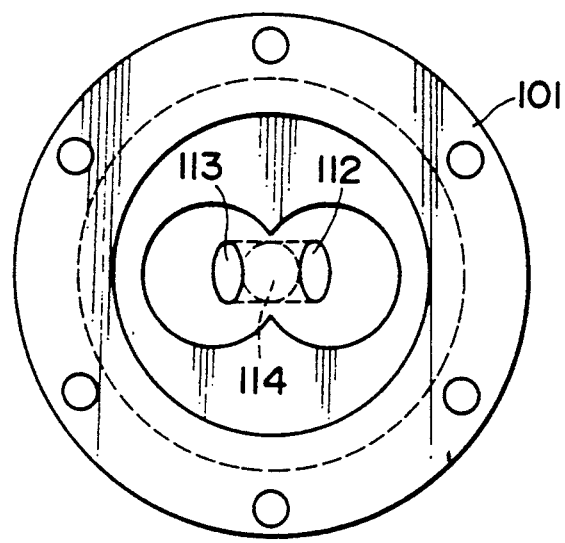
FIG. 8 is a side elevational view taken along an arrow C—C in FIG. 5.

As shown in FIGS. 5 and 7, the present invention provides a second preferred embodiment. The food material kneaded and melted at a high temperature and under a high pressure within an extruder barrel 106 is flowed into a uniform pressure chamber 107 within a die holder 101 connected to the barrel 106. The food material is supplied at an equal pressure and uniform state into each of several extruder molding grooves 108 of desired round or rectangular section arranged axially in parallel over an entire outer circumferential surface of a cylindrical die core 103 fitted internally to a die outer cylinder 102 connected to the die holder 101. Then the material is extruded and molded along the grooves 108, respectively. At this time, since the grooves 108 define a nozzle port of a narrow diameter, the material in each of the grooves 108 can be formed into a superior fibrous tissue state. In this way, the thread-like product having a fine diameter which is entirely formed into fine fibrous tissue is discharged at the end of each of the extruder molding grooves 108 at the die core 103, resulting in that a mass-production of the thread-like product having any optional section of a target item is continuously carried out. That is, since a formation of the fibrous tissue of the material and a formation of thread of the material are simultaneously carried out, a post processing facility such as a sheet element slitting system is not required at all. In addition, these operations are carried out within a sealed space such as the die outer cylinder 102 and the die core 103, so that deterioration in quality or mixture of foreign material may not be generated, thereby improving the sanitary state of the product, and further the flow of material is uniformly carried out by the extruder molding grooves 108 formed over an entire length of the die core 103 and its fibrous formation is made quite superior so as not to cause any disturbance in its tissue. In this case, since the die holder 101, the die outer cylinder 102 and the die core 103 are provided with a temperature adjusting means, respectively, a temperature of the material can be detected within a uniform pressure chamber 107 and a heating or a cooling heat treatment can be easily adjusted.

The extruder of the preferred embodiment is illustrated as a two-axial shaft type extruder, wherein screw shafts 110 and 111 are arranged in parallel within the extruder barrel 106. The die holder 101 is connected to the discharging port of the barrel 106 through a pivoting mechanism such as a hinge and a pin or the like (not shown) in such a way that it may be freely opened or closed. The material, for example, the food material having as its major substance a fish kneaded meat or the like extruded from the screw shafts 110 and 111 is guided by passages 112 and 113 via a separation guide 112a, respectively, and the uniform pressure chamber 107 is formed past the passage 114 for making an integral formation of the materials from within the passages 112 and 113. An outer periphery of the extruder barrel 106 is provided with a temperature adjusting means 115 such as a well-known heater or a cooling jacket or the like. An outer periphery of the die holder 101 is also provided with a temperature adjusting means 118 such as an electrical heater 116 and a water-cooled jacket 117 or the like. To the front end of the die holder 101 is connected a cylindrical die outer cylinder 102 of a double structure of an outer cylinder 102a and an inner cylinder 102b. The inner cylinder 102b has the same diameter as that of the uniform pressure chamber 107 of the die head 101. Between the cylinders 102a and 102b is arranged a temperature adjusting means 121 for use in cooling operation, including the supplying and discharging ports 119 and 119 and screw walls 120 so as to perform an indirect cooling of the material from outside. The cylindrical die core 103 is fitted within the inner cylinder 102b in the die outer cylinder 102 as shown in FIGS. 5 and 7, and the extruder molding grooves 108 have square, triangular or round or any other sectional shape in parallel to each other over an axial entire length of the core. A closing plug 124 is threaded into an end of the core 103 extending through a flange 122 fixed to the other end. A bracket flange 123 of the die outer cylinder 102 and/oppositely fastened to the flange 122 via an adjusting bolt 104 threadably and removably fitted to the other end of the die. A fitting length of the die core 103 on the die outer circumference 102 can be freely adjusted by the adjusting bolt 104. A cooling pipe 126 having several screw walls 125 is internally arranged within the die core 103. The cooling pipe 126 is inserted into the die core 103 from the closing plug 124 and then the supplying or discharging pipes 127, 127 for flowing the cooling water into the cooling pipe 126 are arranged at the other end of the cooling pipe 126. A temperature adjusting means 128 for performing a cooling operation is thus arranged so as to perform an indirect cooling from inside the core. Within the uniform pressure chamber 107 at one end of the die core 103 is arranged on adjusting heat 105. Different adjusting heads having different shapes and sizes may be replaced or removably installed. A state and an advancing degree of a fibrous tissue formation in the material can be freely selected or adjusted in reference to a fitted length between the die outer cylinder 102 and the die core 103. In addition, a volume of the uniform pressure chamber 107 and a flow speed of the material can be adjusted in response to a characteristic of the material by replacing the head 105.

According to the preferred embodiment of the present invention described above, the food material processed at a high temperature and under a high pressure and melted within the extruder barrel 106 through rotations of the screw shafts 110 and 111 passes from the dividing guide 112a and flows into the uniform pressure chamber 107 through passages 112, 113 and 114. The material of uniform pressure and uniform volume is distributed and supplied from the uniform pressure chamber 107 into each of the extruder molding grooves 108, a fibrous tissue formation of the food material is carried out along the grooves 108. As described earlier, a closing of the inner surface of each of the grooves 108 and the inner circumferential surface of the die outer cylinder 102 contacting with the grooves causes the grooves 108 to be made equal to the nozzle hole having a narrow opening diameter. The fibrous tissue in the food material has no disturbance or no imbalanced state, but is uniformly and stably promoted, and the product is continuously made as a respective thread-like item. In case of this thread-like product, since the entire outer circumferential surface of the material is closely restricted with the grooves 108 and the inner surface of the die outer cylinder 102, there is no sliced surface as found in the prior art. The entire surface becomes an extruded and molded surface, so that its taste is improved, a free sectional shape of the food may easily be attained and at the same time its quality is superior. Since the die holder 101, the die outer cylinder 102 and the die core 103 are provided with a temperature adjusting means, respectively, it is possible to detect a material temperature within the uniform pressure chamber 107 and to perform an easy adjustment of either the heating or cooling thermal treatment. In addition, in case of the preferred embodiment, a fitted length of the die core 103 and the die outer cylinder 102 can be freely adjusted to extend or retract to enable a state of the fibrous tissue to be freely adjusted in response to material and object and at the same time adjusting head 105 projecting into the uniform pressure chamber 107 may be freely replaced or removably attached, so that any head 105 having a different shape and a different length can be applied to control a volume within the uniform pressure chamber 107 and a flow speed of the material in compliance with a characteristic of the material. It is also possible to adjust a variation of the formation of tissue caused by a variation in nature of the raw material or to adjust a formation of the tissue in response to a required quality and then a material control in response to the object and requirement may easily be attained.

The die head of the present invention is superior in view of the facts that the cylindrical outer die 102 is fitted to the die core 103 and the extruder molding grooves 108 are formed at an outer peripheral surface of the die core 103, that an entire die head is made compact in size, that several thread-like mass-produced items can be attained simply and efficiently, that a material flow is uniform and its fibrous tissue formation is uniformly and stably attained, that the fibrous tissue formation and the thread-like molding of the product may be simultanesouly attained and a post-processing such as a cutting operation or the like can be eliminated, and that a rational formation of a facility and a safe operation having no opportunity of mixing of hazardous foreign material can be attained. In addition, the present invention is superior in an improvement in taste or an eating taste due to an entire surface of the thread-like product having extruding molded surface in contrast to the prior art product requiring a cutting sliced surface. The present invention is superior since a sectional shape of the product can be freely and optionally selected, an adjustment of the material within the die head can be performed better than that of the prior art and the present invention can be advantageously applied as means for manufacturing thread-like food such as a crab stick or the like, for example.

According to the present invention described above in detail, the major material is extruded from a plurality of axial holes 7 formed by the molding barrel 2 and the core 6 to make a thread-like major material, so that a uniform thread-like product can be made and further the molten sub-material is supplied to the thread-like product at the annular clearance 12 so as to enable them to be collected and bound at the narrow die hole 9, resulting in that the imitation food such as a crab stick having thread-like materials bound to each other can be made more accurately, easily and simply while improving its quality and a facility for making it can be installed simply in a less-expensive manner.

The molding units A provided with the molding barrel 2, the core 6 and the die head 10 are arranged in a circular form on the fixing block 5, the extruder device 19 provided with the extruder barrel 20 and the extruder screws 21 is arranged concentrically around a center of the circular arrangement of the molding units, the major material is supplied from the extruder device 19 to the annular spacing 26 at the rear outer circumference of the core 6 through the circular extruding spacing 23, so that it becomes possible to supply the major material from one extruder 19 to a plurality of molding units A under a uniform condition and then a mass-production of the product can be carried out without decreasing its quality and further its facility cost can be reduced.

What is claimed is:
1. A food extruder assembly including a food extruder comprising:
a molding barrel;
a core having an axis and a periphery and being fitted in the molding barrel, at least one of the molding barrel and core defining a plurality of axial passages spaced circumferentially about the core periphery, said core having a conical part at an end thereof;

a die head positioned in facing relation to said cone part so as to define an annular clearance therebetween, said die head having a die hole communicating with said axial passages via said annular clearance;

means for passing a main material through said passages to said annular clearance; and means for supplying a molten sub-material to said annular clearance for mixing with said main material, whereby the mixed main material and sub-material may be extruded through said die opening.

2. The food extruder assembly of claim 1 wherein said axial passages are defined by cooperation of said core and said molding barrel.

3. The food extruder assembly of claim 1 wherein said means for supplying a molten sub-material comprises a pump independent of said means for passing a main material.

4. A food extruder assembly including a plurality of food extruders arranged in a circle, each of which comprises:

a molding barrel;

a core having an axis and a periphery and being fitted in the molding barrel, at least one of the molding barrel and core defining a plurality of axial passages spaced circumferentially about the core periphery, said core having a conical part at an end thereof;

a die head positioned in facing relation to said cone part so as to define an annular clearance therebetween, said die head having a die hole communicating with said axial passages via said annular clearance;

means for passing a main material through said passages to said annular clearance, said means for passing a main material comprising a main material extruder device having a barrel arranged to pass through substantially the center of the circle, the axial passages of each of the food extruders communicating with said barrel for supplying the main material under pressure to said passages; and means for supplying a molten sub-material to said annular clearance for mixing with the main material, whereby the mixed main material and sub-material may be extruded through said die opening.

5. A food extruder assembly including a food extruder comprising:

a molding barrel;

a core having an axis and a periphery and being fitted in the molding barrel, at least one of the molding barrel and core defining a plurality of axial passages spaced circumferentially about the core periphery, said core having a conical part at an end thereof;

a die head positioned in facing relation to said cone part so as to define an annular clearance therebetween, said die head having a die hole communicating with said axial passages via said annular clearance;

means for passing a main material through said passages to said annular clearance;

means for supplying a molten sub-material to said annular clearance for mixing with said main material, whereby the mixed main material and sub-material may be extruded through said die opening; and core cooling means comprising a finned cooling fluid passage extending through said core.

* * * * *